(12) United States Patent
Wang et al.

(10) Patent No.: US 11,907,758 B2
(45) Date of Patent: Feb. 20, 2024

(54) OUT-OF-ORDER DATA GENERATION METHOD AND APPARATUS, AND DEVICE AND STORAGE MEDIUM

(71) Applicant: INSPUR SUZHOU INTELLIGENT TECHNOLOGY CO., LTD., Jiangsu (CN)

(72) Inventors: Xiangke Wang, Jiangsu (CN); Meng Yang, Jiangsu (CN); Kai Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/255,922

(22) PCT Filed: Oct. 29, 2021

(86) PCT No.: PCT/CN2021/127319
§ 371 (c)(1),
(2) Date: Jun. 5, 2023

(87) PCT Pub. No.: WO2023/024246
PCT Pub. Date: Mar. 2, 2023

(65) Prior Publication Data
US 2023/0401093 A1 Dec. 14, 2023

(30) Foreign Application Priority Data
Aug. 25, 2021 (CN) .......................... 202110978207.6

(51) Int. Cl.
*G06F 9/48* (2006.01)
(52) U.S. Cl.
CPC ................................. *G06F 9/4881* (2013.01)
(58) Field of Classification Search
None
See application file for complete search history.

(56) References Cited

U.S. PATENT DOCUMENTS 7,308,686 B1 * 12/2007 Fotland ................. G06F 9/4881
712/228
8,438,306 B2 * 5/2013 De Lescure ........ G06F 13/4027
709/250

(Continued)

FOREIGN PATENT DOCUMENTS

| CN | 1842054 A | 10/2006 |
|----|-----------|---------|
| CN | 102096734 A | 6/2011 |

(Continued)

OTHER PUBLICATIONS

International search report for PCT/CN2021/127319 dated May 19, 2022.

(Continued)

*Primary Examiner* — Van H Nguyen
(74) *Attorney, Agent, or Firm* — Dennemeyer & Associates LLC; Victoria Friedman

(57) ABSTRACT

Disclosed in the present disclosure is an out-of-order data generation method. The method comprises: creating a plurality of threads; instructing all threads to acquire transmission permission in a manner of acquisition after random delay, determining, after any thread acquires the transmission permission, a thread as the current thread, and instructing the current thread to drive currently generated data and a corresponding data ID to an AXI bus for reading by a receiving end, so as to implement an out-of-order reading test on the basis of the data and corresponding data identifier that are read by the receiving end; and after sending, by the current thread, of the currently generated data and the corresponding data identifier ends, recycling the transmission permission, and returning to execute the step of instructing the all threads to acquire the transmission permission in the manner of acquisition after the random delay.

19 Claims, 2 Drawing Sheets

(56) References Cited

U.S. PATENT DOCUMENTS

| | | | | |
|---|---|---|---|---|
| 8,972,995 B2* | 3/2015 | Srinivasan | ............ | G06F 9/526 |
| | | | | 712/30 |
| 9,444,757 B2* | 9/2016 | Pekcan | ............... | H04L 47/522 |
| 2007/0157030 A1 | 7/2007 | Feghali et al. | | |
| 2011/0055439 A1* | 3/2011 | Chen | ................. | G06F 13/4027 |
| | | | | 710/57 |
| 2016/0188501 A1 | 6/2016 | Chan et al. | | |

FOREIGN PATENT DOCUMENTS

| | | |
|---|---|---|
| CN | 107203462 A | 9/2017 |
| CN | 110324370 A | 10/2019 |
| CN | 111835770 A | 10/2020 |
| CN | 113419869 A | 9/2021 |

OTHER PUBLICATIONS

Search report for Chinese application No. 202110978207.6 filed on Aug. 25, 2021.

* cited by examiner

OUT-OF-ORDER DATA GENERATION METHOD AND APPARATUS, AND DEVICE AND STORAGE MEDIUM

CROSS-REFERENCE TO RELATED APPLICATIONS

This is a 35 U.S.C. 371 National Stage Patent Application of International Application No. PCT/CN2021/127319, filed Oct. 29, 2021, which claims priority to Chinese application 202110978207.6, filed Aug. 25, 2021, each of which is hereby incorporated by reference in its entirety.

TECHNICAL FIELD

The present disclosure relates to an out-of-order data generation method and apparatus, and a device and a storage medium.

BACKGROUND

An Advanced eXtensible Interface (AXI) protocol is a high-performance, high-bandwidth, low-latency on-chip bus protocol that supports out-of-order transmission characteristics. Specifically, for the out-of-order transmission characteristics, a sending end may return data of different identifiers (IDs) in an out-of-order manner by means of an AXI bus (the AXI bus being a bus for implementing data transmission on the basis of the AXI protocol) without being constrained by a sequence of the IDs; and after reading the data from the AXI bus, a receiving end may analyze the read data to obtain correct data. In order to implement the above out-of-order transmission characteristics, the receiving end is required to support out-of-order reading of the AXI protocol. However, the inventor realized that, in the related art, in order to verify whether the receiving end supports out-of-order reading of the AXI protocol, a single thread is generally used to generate continuous data, so as to transmit the continuous data to the receiving end by means of the AXI bus, which apparently cannot effectively simulate the scenario of out-of-order reading, and thus cannot realize the effective testing of whether the receiving end supports out-of-order reading of the AXI protocol.

SUMMARY

An embodiment of the present disclosure provides an out-of-order data generation method. The method includes:
it is determined that whether a receiving end supports out-of-order reading of an Advance eXtensible Interface (AXI) protocol needs to be tested, and a plurality of threads are created on the basis of the determination, the plurality of threads corresponds to a plurality of data identifiers on a one-to-one basis;
all threads are instructed to acquire transmission permission in a manner of acquisition after random delay, after any thread in the all threads acquires the transmission permission, the any thread is determined as a current thread, and the current thread is instructed to drive currently generated data and a corresponding data identifier to an AXI bus for reading by the receiving end, so as to implement an out-of-order reading test on the basis of the data and the corresponding data identifier that are read by the receiving end, wherein only one thread is allowed to acquire the transmission permission at the same momen;
after sending, by the current thread, of the currently generated data and the corresponding data identifier ends, the transmission permission is recycled, and the step of instructing the all threads to acquire the transmission permission in the manner of acquisition after the random delay is returned to be executed.

An embodiment of the present disclosure further provides an out-of-order data generation apparatus. The apparatus includes a creation component, a sending component, and a return component.

The creation component is configured to determine that whether a receiving end supports out-of-order reading of an AXI protocol needs to be tested, and create a plurality of threads on the basis of the determination, the plurality of threads correspond to a plurality of data identifiers on a one-to-one basis.

The sending component is configured to instruct all threads to acquire transmission permission in a manner of acquisition after random delay, determine, after any thread in the all threads acquires the transmission permission, the any thread as a current thread, and instruct the current thread to drive currently generated data and a corresponding data identifier to an AXI bus for reading by the receiving end, so as to implement an out-of-order reading test on the basis of the data and the corresponding data identifier that are read by the receiving end. Only one thread is allowed to acquire the transmission permission at the same moment.

The return component is configured to, after sending, by the current thread, of the currently generated data and the corresponding data identifier ends, recycle the transmission permission, and return to execute instruction for the all threads to acquire the transmission permission in the manner of acquisition after the random delay.

An embodiment of the present disclosure further provides a computer device. The computer device includes a memory, and one or more processors. The memory stores a computer-readable instruction, and when the computer-readable instruction is executed by the one or more processors, the one or more processors are enabled to execute steps of the out-of-order data generation method described in any one of the above. An embodiment of the present disclosure further provides one or more non-transitory computer-readable storage medium storing a computer-readable instruction. When the computer-readable instruction is executed by one or more processors, the one or more processors are enabled to execute steps of the out-of-order data generation method described in any one of the above.

The details of one or more embodiments of the present disclosure are set forth in the drawings and the description below. Other features and advantages of the present disclosure will be apparent from the drawings and the claims from the specification.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings in the following descriptions are merely the embodiments of the present disclosure. Other drawings can be obtained from those skilled in the art according to the provided drawings without any creative work.

DETAILED DESCRIPTION OF THE EMBODIMENTS

The technical solutions in the embodiments of the present disclosure will be clearly and completely described below in combination with the drawings in the embodiments of the present disclosure. It is apparent that the described embodiments are only part of the embodiments of the present disclosure, not all the embodiments. All other embodiments obtained by those of ordinary skill in the art on the basis of the embodiments in the present disclosure without creative work all fall within the scope of protection of the present disclosure.

Figure 1:
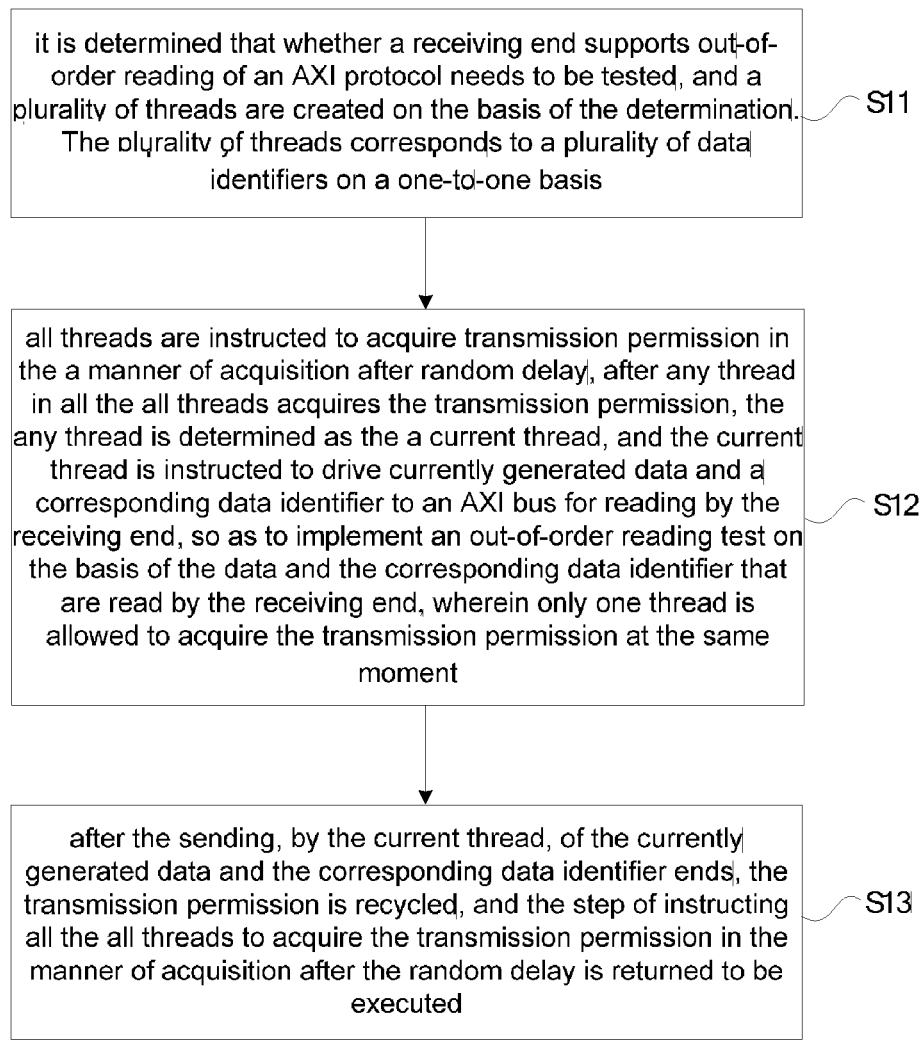
FIG. 1 is a flowchart of an out-of-order data generation method according to one or more embodiments of the present disclosure.

FIG. 1 is a flowchart of an out-of-order data generation method according to an embodiment of the present disclosure.

At S11, it is determined that whether a receiving end supports out-of-order reading of an Advance eXtensible Interface (AXI) protocol needs to be tested, and a plurality of threads are created on the basis of the determination, the plurality of threads corresponds to a plurality of data identifiers on a one-to-one basis.

An execution subject of the out-of-order data generation method provided in the embodiments of the present disclosure may be a corresponding generation apparatus. The generation apparatus may be disposed in a sending end, such that an execution subject of a test method may be the sending end. The test method below is specifically described by using the execution subject as the sending end. It is to be noted that, the sending end is a terminal for simulating data generation and sending; and the receiving end (having a corresponding IP) is a terminal that needs to test whether the receiving end can support out-of-order reading of the AXI protocol.

After the sending end and the receiving end are determined, the sending end may locally create the plurality of threads; and each thread may separately generate data and send the generated data (the data being test data for implementing tests), so as to simulate the generation and sending of the data. Specifically, the data ID may be the data ID (which can identify signs transmission transaction of the AXI protocol, and is used for distinguishing a plurality of transaction transmissions). Definitely, other setting may be performed according to actual requirements. The embodiments of the present disclosure are specifically described by using the data ID as the data ID. The data generated by means of simulation is grouped on the basis of the data ID. The data generated by the same data ID is continuous, and different data IDs have different data streams. In the embodiments of the present disclosure, the created threads are set to correspond to the data IDs on a one-to-one basis, such that the data generated by any thread is the data with the corresponding data ID of the thread; and a plurality of pieces of data generated by the thread are the data stream with the corresponding data IDs of the thread.

At S12, all threads are instructed to acquire transmission permission in a manner of acquisition after random delay, after any thread in the all threads acquires the transmission permission, the any thread is determined as a current thread, and the current thread is instructed to drive currently generated data and a corresponding data identifier to an AXI bus for reading by the receiving end, so as to implement an out-of-order reading test on the basis of the data and the corresponding data identifier that are read by the receiving end, wherein only one thread is allowed to acquire the transmission permission at the same moment.

The receiving end randomly issues the threads of a plurality of reading data transactions by reading a data channel; the threads of the reading data transactions read, from the AXI bus, the data and the corresponding data IDs that are sent by the sending end; and the read data corresponds to the data ID randomly and data addresses are random, which is out-of-order reading data. Correspondingly, the sending end may start all of the created threads. Each of these threads circularly generates the data; and the data generated by the threads is the data of the corresponding data IDs that need to be driven to the AXI bus. The generation of the data by the threads may be random, or may be implemented according to rules set on the basis of actual requirements, which all within the scope of protection of the present disclosure. In addition, these threads also acquire the transmission permission after random delay, or the transmission permission is randomly given to any thread in these threads (only one thread can implement data sending by using the AXI bus at the same moment). The thread acquiring the transmission permission may drive the data newly generated by the thread to the AXI bus, such that the receiving end reads the data from the AXI bus. After the thread drives the data and the corresponding data IDs to the AXI bus, the transmission permission may be released, so as to allow all the threads started by the sending end to acquire the transmission permission after random delay, that is, the moments that all the threads acquire the transmission permission are random, and so on, such that the random threads drive the generated data and the corresponding data Ids to the AXI bus. Since the threads correspond to the data IDs on a one-to-one basis, the random threads drive the generated data to the AXI bus, that is, the data of random data IDs is driven to the AXI bus, such that the simulation of out-of-order reading is achieved.

In addition, any thread may send the data every time when generating the data, and generate the next data after sending the data. Other setting may also be performed according to actual requirements, which are all within the scope of protection of the present disclosure.

At S13, after sending, by the current thread, of the currently generated data and the corresponding data identifier ends, the transmission permission is recycled, and the step of instructing the all threads to acquire the transmission permission in the manner of acquisition after the random delay is returned to be executed.

In the present disclosure, the plurality of threads is set. Different threads correspond to different data IDs; and each thread circularly generates the data of the corresponding data IDs, so as to drive, by circularly selecting the random threads, the data and the corresponding data IDs that are generated by the selected thread to the AXI bus, such that the receiving end can circularly read the random data IDs and the corresponding data from the AXI bus, so as to effectively simulate a scenario of out-of-order reading of the AXI protocol, such that whether the receiving end supports out-of-order reading of the AXI protocol is effectively tested.

In some embodiments, the step of instructing the all threads to acquire the transmission permission in the manner of acquisition after the random delay may include the following operation.

The all threads are instructed to acquire the transmission permission in the manner of acquiring a key after the random delay; and the key is a tool that makes a thread able to use corresponding semaphore to implement the sending of corresponding data of the AXI protocol.

The step of after sending, by the current thread, of the currently generated data and the corresponding data identifier ends, recycling the transmission permission may include the following operation.

After sending, by the current thread, of the currently generated data and the corresponding data identifier ends, the key is recycled.

It is to be noted that, in order to simply and effectively achieve the control of the transmission permission, in the embodiments of the present disclosure, semaphore may be created. The semaphore may be considered as access control to the same resource. Any thread can use the AXI bus by means of the semaphore (including driving the data to the AXI bus); and one key is assigned for the semaphore. After acquiring the key, the thread may use the key to use the corresponding semaphore, so as to use the AXI bus by means of the semaphore. Correspondingly, in the embodiments of the present disclosure, the thread may first acquire the key when needing to drive the data to the AXI bus, and then use the key to use the corresponding semaphore after acquiring the key, such that the data is driven to the AXI bus by means of the semaphore, and then the key is timely returned, so as to start a new round of key acquisition and AXI bus use.

In some embodiments, after the plurality of threads are created, the method may further include the following operation.

The plurality of threads which are created are added to a queue of threads to be executed as the threads to be executed.

After the current thread is determined, the method may further include the following operation.

The current thread is extracted from the queue of the threads to be executed as an execution thread, so as to execute the current thread.

In the embodiments of the present disclosure, the sending end may be set with the queue of the threads to be executed, such that the thread that can currently use the AXI bus may be extracted from the queue of the threads to be executed, so as to execute the thread to drive the generated data to the AXI bus; and other threads are stored in the queue of the threads to be executed as the threads to be executed, waiting to be executed. It can be seen that, by means of the present disclosure, the convenience of thread management can be improved by means of the setting of the thread queue.

In some embodiments, the operation of controlling the current thread to generate the data corresponding to the data identifier may include the following operation.

The current thread is controlled, according to a principle of one piece of data per clock beat, to generate the data of corresponding data identifier of the current thread.

It is to be noted that, in the embodiments of the present disclosure, a clock may be provided, such that when any thread generates the data, each clock beat corresponds to one piece of data. Therefore, the setting of the clock can be complied when the data is sent, thereby guaranteeing the efficient generation and sending of the data.

In some embodiments, the method may further include the following operation.

The random delay is inserted before the data and the corresponding data identifier are generated each time by the current thread.

It is to be noted that, in the embodiments of the present disclosure, the random delay may further be inserted in the adjacent data generated by each thread. The random delay may be a random number of clock delays, so as to generate random clock intervals of out-of-order data, such that randomized data out-of-order reading is constructed, the AXI reading processing performance of the receiving end in the case of multiple data interweaving is fully verified, and the support of the receiving end to the AXI bus protocol is fully verified.

In some embodiments, the method may further include the following operation.

The data and the corresponding data identifier that are generated by the current thread are sent to a test apparatus, so as to allow the test apparatus to perform a corresponding out-of-order reading test on the basis of the data sent by the current thread, the data received by the receiving end, and respectively-corresponding data identifiers.

In the embodiments of the present disclosure, in addition to driving the data and the corresponding data identifier to the AXI bus, the sending end may also send the data and the corresponding data identifier to a test apparatus. Correspondingly, after receiving the data and the corresponding data identifier that are generated by the sending end, the test apparatus may also acquire the data and the corresponding data identifier that are subjected to out-of-order reading and processing by the receiving end. Then comparison is performed, if both are consistent, it indicates that the receiving end can support data out-of-order reading, otherwise, it indicates that the receiving end cannot support data out-of-order reading, such that the efficiency of testing whether the receiving end can support data out-of-order reading is effectively improved.

In some embodiments, the step of creating the plurality of threads may include the following operation.

The plurality of threads are created on the basis of a validation programming language.

It is to be noted that, the validation programming language may specifically be a System Verilog language. The System Verilog language (an advanced validation programming language with object-oriented support) may simultaneously issue and execute the plurality of threads. Each of the threads is separately executed, and there is an inter-thread communication mode between the threads, such that sequential execution (for example, an event) among the threads, conflict management (for example, the semaphore) of resources shared among the threads, and synchronous transmission (for example, a mailbox) among the threads may be achieved. The reading return of AXI multi-transaction data only has one set of AXI buses. The returning of the data by the plurality of data Ids needs to perform access control on the same bus resource, just as the request control of the plurality of threads to the same resource. Therefore, in the embodiments of the present disclosure, the plurality of threads are created on the basis of the System Verilog language, such that interleaving timing processing of the data of the plurality of data IDs at a clock beat dimension is achieved by combining the plurality of threads with the access control of the semaphore, only one thread occupies the data returned by the AXI bus at each clock beat, and the thread data that does not occupy the bus waits for sending. In this way, the data of each thread is still the clock sequence of the data, and operations of thread control can be effectively realized. In addition, the test apparatus in the embodiments of the present disclosure may also be understood as constructed Universal Verification Methodology (UVM), which is a verification platform using a System Verilog class library as the subject, and reusable components of the apparatus are used to construct a functional verification environment with hierarchical structures and interfaces.

In the present disclosure, when functional verification of the AXI bus is performed, the plurality of threads are used to simulate and generate, at the clock beat dimension, read data of multiple transactions returned to the AXI bus, such that the interweaving of different supported ID data in the AXI protocol is met, so as to test the support of the receiving end to multi-transaction out-of-order reading in the AXI protocol. In addition, when the random delay is inserted in each thread to simulate various interweaving situations, the support of the receiving end to out-of-order reading of the AXI protocol is further fully tested. the same ID data is still returned according to the sequence of the data, and there is no constant sequence requirement among the data of different IDs.

It is to be understood that, although the various steps in the flowcharts of FIG. 1 are displayed in sequence as indicated by the arrows, these steps are not necessarily executed in sequence in the order indicated by the arrows. Unless otherwise specified herein, there is no strict order for the execution of these steps, and these steps can be executed in other orders. Moreover, at least part of the steps in FIG. 1 may include a plurality of sub-steps or a plurality of stages. These sub-steps or stages are not necessarily executed at a same time, but can be executed at different times. These steps or stages are not necessarily executed in sequence, but may be executed in turns or alternately with other steps or at least a part of the sub-steps or stages in other steps.

Figure 2:
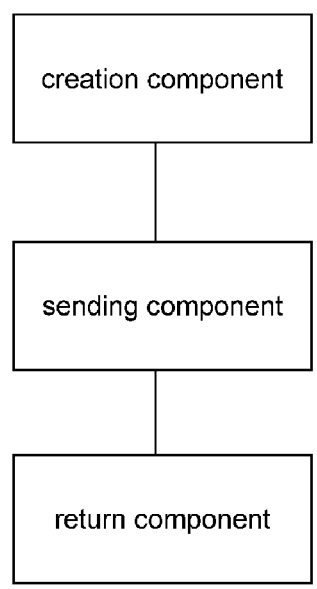
FIG. 2 is a block diagram of an out-of-order data generation apparatus according to one or more embodiments of the present disclosure.

An embodiment of the present disclosure further provides an out-of-order data generation apparatus. As shown in FIG. 2, the apparatus includes a creation component, a sending component, and a return component.

The creation component 11 is configured to determine that whether a receiving end supports out-of-order reading of an AXI protocol needs to be tested, and create a plurality of threads on the basis of the determination. The plurality of threads correspond to a plurality of data identifiers on a one-to-one basis.

The sending component 12 is configured to instruct all threads to acquire transmission permission in a manner of acquisition after random delay, determine, after any thread in the all threads acquires the transmission permission, the any thread as a current thread, and instruct the current thread to drive currently generated data and a corresponding data identifier to an AXI bus for reading by the receiving end, so as to implement an out-of-order reading test on the basis of the data and the corresponding data identifier that are read by the receiving end. Only one thread is allowed to acquire the transmission permission at the same moment.

The return component 13 is configured to, after sending, by the current thread, of the currently generated data and the corresponding data identifier ends, recycle the transmission permission, and return to execute instruction for the all threads to acquire the transmission permission in the manner of acquisition after the random delay.

In some embodiments, the sending component may include an acquisition unit.

The acquisition unit is configured to instruct the all threads to acquire the transmission permission in the manner of acquiring a key after random delay. The key is a tool that makes the thread able to use corresponding semaphore to implement the sending of corresponding data of the AXI protocol.

The return component may include a recycling unit.

The recycling unit is configured to, after the sending, by the current thread, of the currently generated data and the corresponding data identifier ends, recycle the key.

In some embodiments, the apparatus may further include an addition component and an extraction component.

The addition component is configured to add, after the plurality of threads are created, the created threads to a queue of the threads to be executed as threads to be executed.

The extraction component is configured to extract, after the current thread is determined, the current thread from the queue of the threads to be executed as an execution thread, so as to execute the current thread.

In some embodiments, the apparatus may further include an insertion component.

The insertion component is configured to insert random delay before the data and the corresponding data identifier are generated each time by the current thread.

In some embodiments, the apparatus may further include a generation component.

The generation component is configured to control, according to the principle of one piece of data per clock beat, the current thread to generate the data of corresponding data identifier of the current thread.

In some embodiments, the apparatus may further include a test component.

The test component is configured to send the data and the corresponding data identifier that are generated by the current thread to a test apparatus, so as to allow the test apparatus to perform a corresponding out-of-order reading test on the basis of the data sent by the current thread, the data received by the receiving end, and respectively-corresponding data identifiers.

In some embodiments, the creation component may include a creation unit.

The creation unit is configured to create the plurality of threads on the basis of a System Verilog language.

An embodiment of the present disclosure further provides a computer device. The computer device may include a memory, and one or more processors. The memory stores a computer-readable instruction, and when the computer-readable instruction is executed by the one or more processors, the one or more processors are enabled to execute steps of the out-of-order data generation method described in any one of the above.

An embodiment of the present disclosure further provides one or more non-transitory computer-readable storage medium storing a computer-readable instruction. When the computer-readable instruction is executed by one or more processors, the one or more processors are enabled to execute steps of the out-of-order data generation method described in any one of the above. It is to be noted that, the description of the relevant part of the out-of-order data generation apparatus, the device and the storage medium provided in the embodiments of the present disclosure is found in the detailed description of the corresponding part of the out-of-order data generation method provided in the embodiments of the present disclosure, which is not described herein again. In addition, the above technical solutions provided in the embodiments of the present disclosure are not described in detail with the corresponding technical solutions in the related art to achieve the same principle, so as to avoid excessive description.

The foregoing description of the disclosed embodiments enables a person skilled in the art to implement or use the present disclosure. It is apparent that the person skilled in the art will make many modifications to these embodiments, the general principles defined in the disclosure may be achieved in the other embodiments without departing from the spirit or scope of the present disclosure. Therefore, the present disclosure will not be limited to the embodiments shown herein, but to conform to the maximum extent of principles and new features that are disclosed herein.

What is claimed is:

1. An out-of-order data generation method, comprising:
determining that whether a receiving end supports out-of-order reading of an Advance eXtensible Interface (AXI) protocol needs to be tested, and creating a plurality of threads on the basis of the determination, wherein the plurality of threads correspond to a plurality of data identifiers on a one-to-one basis;
instructing all threads to acquire transmission permission in a manner of acquisition after random delay, determining, after any thread in the all threads acquires the transmission permission, the any thread as a current thread, and instructing the current thread to drive currently generated data and a corresponding data identifier to an AXI bus for reading by the receiving end, so as to implement an out-of-order reading test on the basis of the data and the corresponding data identifier that are read by the receiving end, wherein only one thread is allowed to acquire the transmission permission at the same moment;
after sending, by the current thread, of the currently generated data and the corresponding data identifier ends, recycling the transmission permission, and returning to execute the step of instructing the all threads to acquire the transmission permission in the manner of acquisition after the random delay;
performing functional verification of the AXI bus, wherein, when the functional verification of the AXI bus is performed, the plurality of threads are used to simulate and generate, at a clock beat dimension, read data of multiple transactions returned to the AXI bus, so as to meet a interweaving of different supported ID data in the AXI protocol, and test a support of the receiving end to multi-transaction out-of-order reading in the AXI protocol; and
inserting the random delay in each thread to simulate various interweaving situations, so as to test the support of the receiving end to multi-transaction out-of-order reading in the AXI protocol.

2. The method according to claim 1, wherein instructing the all threads to acquire the transmission permission in the manner of acquisition after the random delay comprises:
instructing the all threads to acquire the transmission permission in a manner of acquiring a key after the random delay, wherein the key is a tool that makes a thread able to use corresponding semaphore to implement the sending of corresponding data of the AXI protocol; and
after sending, by the current thread, of the currently generated data and the corresponding data identifier ends, recycling the transmission permission comprises:
after sending, by the current thread, of the currently generated data and the corresponding data identifier ends, recycling the key.

3. The method according to claim 2, wherein after the plurality of threads are created, the method further comprises:
adding the plurality of threads which are created to a queue of threads to be executed as the threads to be executed; and
after the current thread is determined, the method further comprises:
extracting the current thread from the queue of the threads to be executed as an execution thread, so as to execute the current thread.

4. The method according to claim 3, further comprising:
inserting the random delay before the data and the corresponding data identifier are generated each time by the current thread.

5. The method according to claim 4, wherein controlling the current thread to generate the data corresponding to the data identifier comprises:
controlling, according to a principle of one piece of data per clock beat, the current thread to generate the data of corresponding data identifier of the current thread.

6. The method according to claim 5, further comprising:
sending the data and the corresponding data identifier that are generated by the current thread to a test apparatus, so as to allow the test apparatus to perform a corresponding out-of-order reading test on the basis of the data sent by the current thread, the data received by the receiving end, and respectively-corresponding data identifiers.

7. The method according to claim 6, wherein creating the plurality of threads comprises:
creating the plurality of threads on the basis of a validation programming language.

8. The method according to claim 2, further comprising:
creating semaphore, wherein, the semaphore is considered as access control to a same resource, the any thread use the AXI bus by means of the semaphore;
assigning one key for the semaphore, wherein after acquiring the key, the any thread use the key to use the corresponding semaphore, so as to use the AXI bus by means of the semaphore.

9. The method according to claim 2, wherein, the any thread is used to first acquire the key when needing to drive a data to the AXI bus, and then use the key to use the corresponding semaphore after acquiring the key, so as to drive the data to the AXI bus by means of the semaphore, and then the any thread is used to return the key timely, so as to start a new round of key acquisition and AXI bus use.

10. The method according to claim 3, wherein, an execution subject of the out-of-order data generation method providedia a corresponding generation apparatus, the generation apparatus is disposed in a sending end, and an execution subject of a step of testing whether the receiving end supports the out-of-order reading of the AXI protocol is the sending end.

11. The method according to claim 10, wherein, the sending end is set with the queue of the threads to be executed, extracting the current thread from the queue of the threads to be executed as an execution thread, so as to execute the current thread, comprises:
extracting a thread that currently able to use the AXI bus from the queue of the threads to be executed, so as to execute the thread to drive the generated data to the AXI bus, wherein other threads are stored in the queue of the threads to be executed as the threads to be executed, waiting to be executed.

12. The method according to claim 4, wherein, the random delay is a random number of clock delays, so as to generate random clock intervals of out-of-order data, and construct randomized data out-of-order reading.

13. The method according to claim 6, wherein, the test apparatus is a constructed Universal Verification Methodology (UVM), which is a verification platform using a System Verilog class library as a subject, and reusable components of the test apparatus are used to construct a functional verification environment with hierarchical structures and interfaces.

14. The method according to claim 7, wherein, the validation programming language is a System Verilog language.

15. The method according to claim 14, wherein, the System Verilog language is used to simultaneously issue and execute the plurality of threads, each of the plurality of threads is separately executed, and there is an inter-thread communication mode between the plurality of threads, which is used to achieve sequential execution among the plurality of threads, conflict management of resources shared among the plurality of threads, and synchronous transmission among the plurality of threads.

16. The method according to claim 1, wherein, each of the plurality of threads is used to separately generate data and send generated data, so as to simulate generation and sending of the data.

17. The method according to claim 1, wherein, the any thread is used to send a data every time when generating the data, and generate a next data after sending the data.

18. A computer device, comprising a memory, and one or more processors, wherein the memory stores a computer-readable instruction, and when the computer-readable instruction is executed by the one or more processors, the one or more processors are enabled to:
   determine that whether a receiving end supports out-of-order reading of an Advance eXtensible Interface (AXI) protocol needs to be tested, and create a plurality of threads on the basis of the determination, wherein the plurality of threads correspond to a plurality of data identifiers on a one-to-one basis;
   instruct all threads to acquire transmission permission in a manner of acquisition after random delay, determining, after any thread in the all threads acquires the transmission permission, the any thread as a current thread, and instruct the current thread to drive currently generated data and a corresponding data identifier to an AXI bus for reading by the receiving end, so as to implement an out-of-order reading test on the basis of the data and the corresponding data identifier that are read by the receiving end, wherein only one thread is allowed to acquire the transmission permission at the same moment;
   after sending, by the current thread, of the currently generated data and the corresponding data identifier ends, recycle the transmission permission, and return to execute the step of instructing the all threads to acquire the transmission permission in the manner of acquisition after the random delay;
   perform functional verification of the AXI bus, wherein, when the functional verification of the AXI bus is performed, the plurality of threads are used to simulate and generate, at a clock beat dimension, read data of multiple transactions returned to the AXI bus, so as to meet a interweaving of different supported ID data in the AXI protocol, and test a support of the receiving end to multi-transaction out-of-order reading in the AXI protocol; and
   insert the random delay in each thread to simulate various interweaving situations, so as to test the support of the receiving end to multi-transaction out-of-order reading in the AXI protocol.

19. A non-transitory computer-readable storage medium, storing a computer-readable instruction, wherein when the computer-readable instruction is executed by one or more processors, the one or more processors are enabled to:
   determine that whether a receiving end supports out-of-order reading of an Advance eXtensible Interface (AXI) protocol needs to be tested, and create a plurality of threads on the basis of the determination, wherein the plurality of threads correspond to a plurality of data identifiers on a one-to-one basis;
   instruct all threads to acquire transmission permission in a manner of acquisition after random delay, determining, after any thread in the all threads acquires the transmission permission, the any thread as a current thread, and instruct the current thread to drive currently generated data and a corresponding data identifier to an AXI bus for reading by the receiving end, so as to implement an out-of-order reading test on the basis of the data and the corresponding data identifier that are read by the receiving end, wherein only one thread is allowed to acquire the transmission permission at the same moment;
   after sending, by the current thread, of the currently generated data and the corresponding data identifier ends, recycle the transmission permission, and return to execute the step of instructing the all threads to acquire the transmission permission in the manner of acquisition after the random delay;
   perform functional verification of the AXI bus, wherein, when the functional verification of the AXI bus is performed, the plurality of threads are used to simulate and generate, at a clock beat dimension, read data of multiple transactions returned to the AXI bus, so as to meet a interweaving of different supported ID data in the AXI protocol, and test a support of the receiving end to multi-transaction out-of-order reading in the AXI protocol; and
   insert the random delay in each thread to simulate various interweaving situations, so as to test the support of the receiving end to multi-transaction out-of-order reading in the AXI protocol.

* * * * *